United States Patent [19]

Van Eck

[11] 4,129,059

[45] Dec. 12, 1978

[54] STAPLE-TYPE FASTENER

[76] Inventor: William F. Van Eck, 228 Main St., East Haven, Conn. 06512

[21] Appl. No.: 521,851

[22] Filed: Nov. 7, 1974

[51] Int. Cl.² ............................................. F16B 15/00
[52] U.S. Cl. ........................................................ 85/49
[58] Field of Search ............... 85/49, 39; 24/216, 204, 24/DIG. 11, DIG. 18

[56] References Cited

U.S. PATENT DOCUMENTS

| 243,605 | 6/1881 | Ott | 85/39 |
|---|---|---|---|
| 389,660 | 9/1888 | Mandel et al. | 85/49 |
| 649,153 | 5/1900 | Ashbaugh et al. | 85/39 |
| 2,451,487 | 10/1948 | Huelster | 85/49 |
| 2,550,549 | 4/1951 | Goodstein | 85/16 |
| 3,279,008 | 10/1966 | Wallach | 24/DIG. 18 |
| 3,357,296 | 12/1967 | Lefever | 85/49 |
| 3,529,649 | 9/1970 | Bennett | 24/204 |
| 3,830,080 | 8/1974 | Friedlander | 24/216 |

FOREIGN PATENT DOCUMENTS 797766   6/1958   United Kingdom ..................... 85/49

Primary Examiner—Thomas J. Holko
Attorney, Agent, or Firm—Kenyon & Kenyon, Reilly, Carr & Chapin

[57] ABSTRACT

A staple-type fastener includes a separate receiving member that is wider than the diameter of the staple prongs. In use, the prongs are inserted through sheets of material to be fastened together and then into the receiving member, which may be fitted with a tab to facilitate removal. One embodiment of the fastener includes a wide upper cross-member to further reduce the tendency of the staple to tear through fastened sheet materials. In another embodiment of the fastener a foldable tab on the receiving member is adapted to have the staple prongs bent over it, the tab facilitating straightening of the prongs for removal of the fastener from the sheets of material.

26 Claims, 19 Drawing Figures

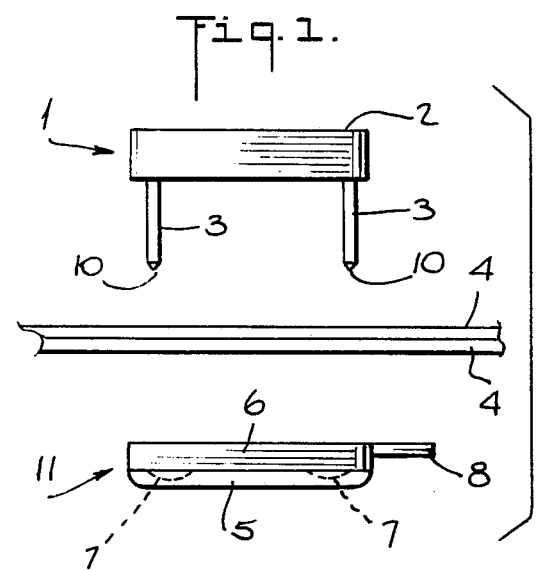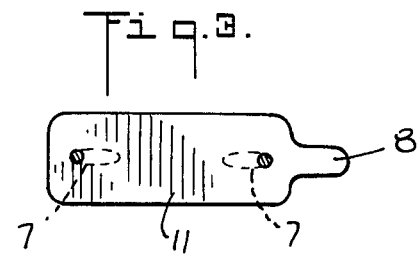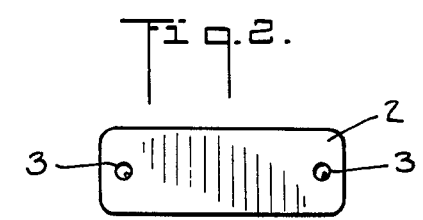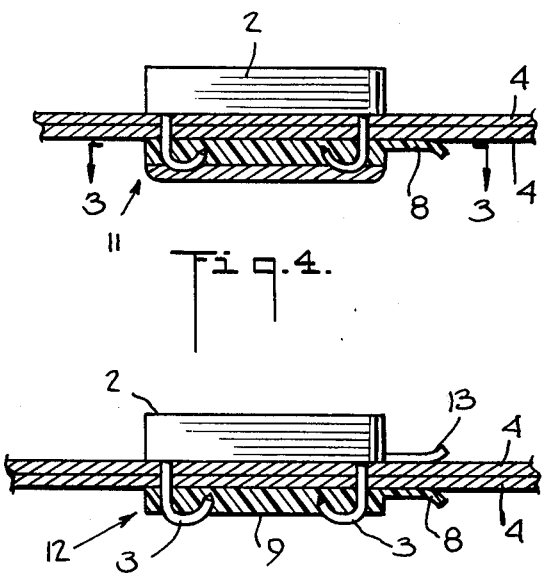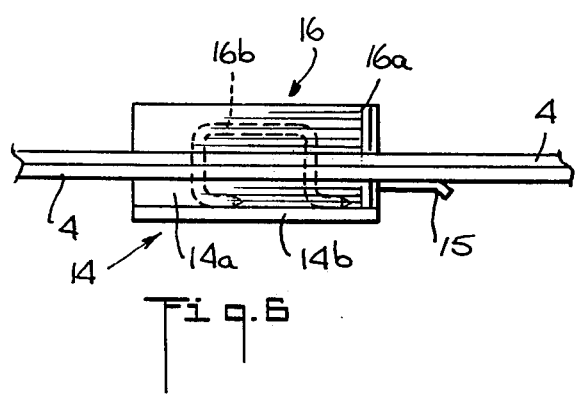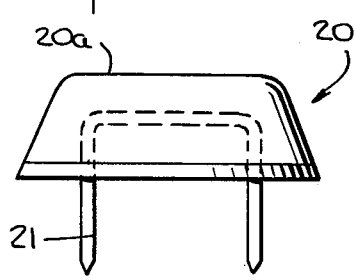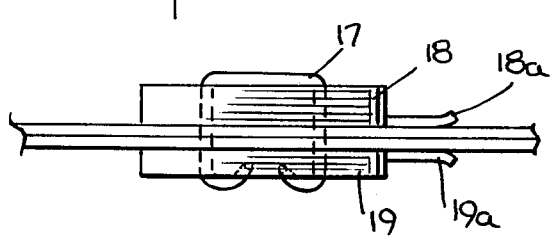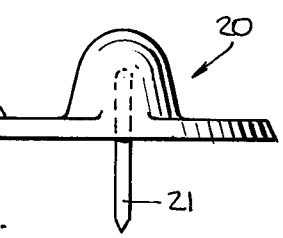

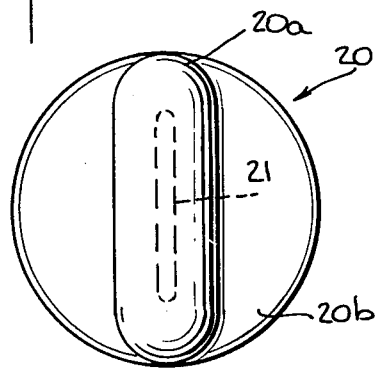
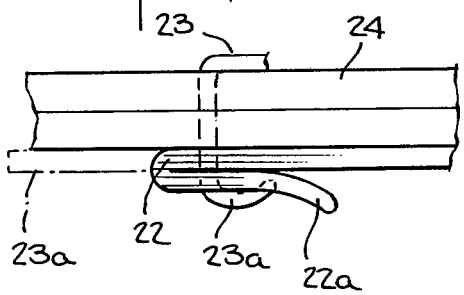
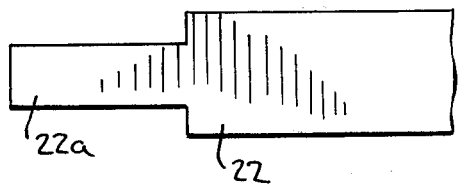
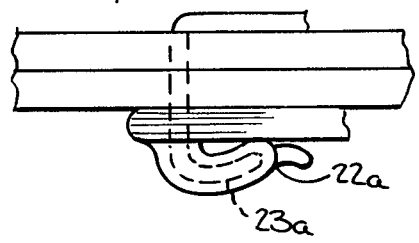
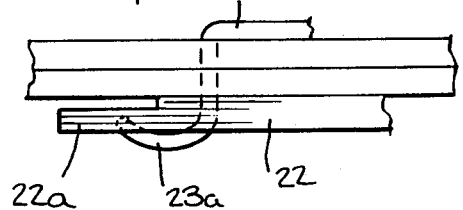
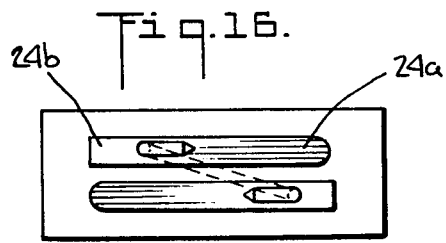
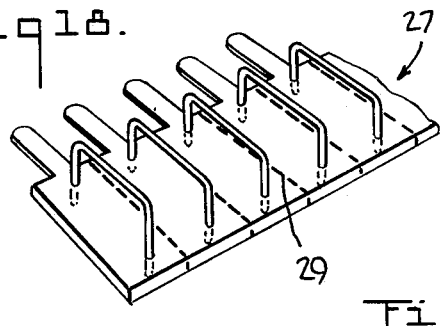
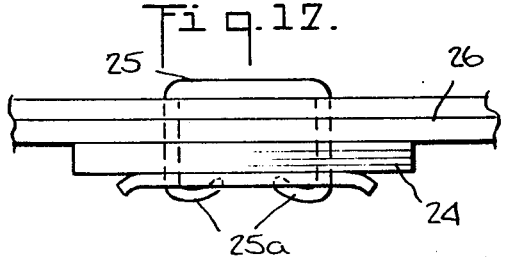
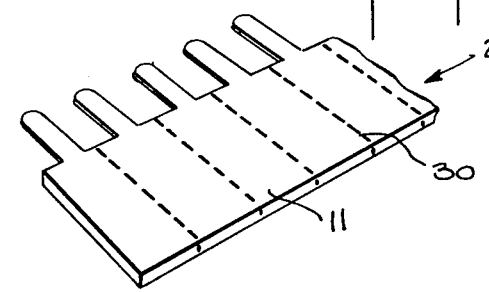

STAPLE-TYPE FASTENER

BACKGROUND OF THE INVENTION

1. Field of the Invention

This invention relates to fasteners for sheet materials and in particular to novel staple-like fasteners which are useful in fastening weak or gossamer sheet materials. The novel fasteners of this invention are easily removed from the sheet materials when it is desired to unfasten them. They also have a reduced tendency to "tear through" the sheet materials being fastened.

2. Description of the Prior Art

U.S. Pat. No. 3,357,296, which issued on Dec. 12, 1967 to K. W. Lefever, discloses a staple fastener in which separate prongs are detachably mounted by ball-shaped end portions in a molded plastic cross-member. A mating plastic receiving element has coaxial apertures in each end into which the exposed pointed ends of the prongs are bent by a specially designed anvil in a stapling machine. In order to disassemble the stapler after it has been applied, it is first necessary to pull the cross-member and the receiving element in opposite directions with sufficient force to detach the ball-shaped end portions of the prongs from the cross-member. Thereafter the ball-shaped end portions must be torn through the sheet material which has been stapled. Because of this detachable construction, the device of the Lefever patent is incompatible with the use of standard wire staples.

U.S. Pat. No. 2,526,902, issued Oct. 24, 1950 to N. C. Rublee, and U.S. Pat. No. 3,076,373, issued Feb. 5, 1963 to C. G. Matthews, while showing single-element staples in which at least a portion of the staple is enclosed in resin material for electrical insulation or improved driveability and holding power, do not disclose a receiving element for protecting sheet material to be stapled.

U.S. Pat. No. 644,976 issued on Mar. 6, 1900 to J. H. Gibson, discloses a wire staple for attaching a carpet to a floor. The staple simply includes a perforated disk-like head for facilitating removal of the staple. The floor serves as the receiving element.

U.S. Pat. Nos. 1,282,845 issued Oct. 29, 1918 to C. A. Johnson, No. 3,368,445 issued Feb. 13, 1968 to J. J. Trzesniewski, and No. 3,610,087 issued Oct. 5, 1971 to A. Dritz, show single-element staple devices in which the prongs are deformed in various configurations during the fastening process.

SUMMARY OF THE INVENTION

The fastener of this invention is ideally suited to the fastening of almost any type of sheet material, as long as the sheet material to be fastened is capable of being penetrated by the prongs of the staple member. However, it is particularly suited to the fastening of sheet materials which are delicate or which can otherwise tear through easily such as paper or cloth. Traditional wire staples are widely used to fasten many types of soft sheet materials, such as paper, fabric, plastic foils, metal foils, etc. During use, the wire prongs are forcibly bent to contact the bottom sheet of material. Removal of the staple is difficult without the use of a mechanical aid. In addition, the sharp ends of the wire prongs can mar the surface of the fastened materials, as well as other items which become adjacent to the bottom of the fastened sheet materials.

The wire cross-member bears the entire stress when holding the sheet materials firmly together. As this wire is generally quite thin, the force per unit area is quite high, and weaker materials such as fabrics can easily be torn through.

The novel fastener of this invention provides a cross-member which is substantially wider than the attached prongs. Thus the area of contact between the cross-member and the sheet material is increased, and correspondingly the force per unit area is reduced. This then decreases the ease with which the sheet material can be torn away.

Additionally, the fasteners of this invention are provided with a bottom elongated receiving plate which also has a relatively large area of contact with the sheet material to be fastened therewith. The receiving plate is preferably made from a soft material, such as soft plastic, in order to allow the pointed ends of the prongs of the staple member to become embedded therein. Thus damage to the sheet materials and to the fingers of the user is diminshed as the sharp ends of the prongs are shielded from contact with the sheet material.

As an example, the novel fasteners of this invention are particularly useful in fastening severals layers of cloth fabric together or to fasten paper to cloth fabric. These fasteners could then find extensive use in the dry-cleaning industry, where identifying sheets of paper are generally fastened to the garments. The traditional wire staples which are presently used often damage the fabric. In many instances, in order to provide sufficient holding strength, the present staples are used accompanied by an excessive amount of force, thereby rendering them extremely difficult to remove from the garment.

The staples of this invention may also be fitted with a tab of material extending from one end of the receiving plate. When it is desired to remove the fastener from the sheet material, the tab is grasped by the fingers and the receiving plate pulled away from the material. This will remove the receiving plate from the prongs, while simultaneously at least partially straightening the bent prongs to facilitate the removal of the staple member from the sheet material. The prior art wire staples require a separate tool to straighten the prongs and ease the removal from the fastened materials.

When it is desired to fasten tougher sheet materials, such as bond paper, then even when the cross-member is not wider than the prongs, the fastener will have unique advantages. The use of the receiving plate in conjunction with this type of staple member will still allow the fastener to be easily removed.

The receiving member of the fastener of the invention can be provided with extensions projecting from the body of the receiving member. The extensions are adapted to be engaged by the end portions of the prongs of the staple member when applying the fastener of the invention.

It is thus an object of this invention to provide an improved staple-type fastener which has a reduced tendency to "tear through" the sheet material being fastened. It is a further object to provide a staple-type fastener which will not damage the materials being fastened therewith, both during use and during removal.

It is a still further object to provide a staple-type fastener which can easily be removed without the use of special tools. And it is a still further object to provide a staple-type fastener wherein the sharp ends of the prongs are encased in a material after fastening.

Further objects will become apparent from the following detailed description of the invention and the appended claims.

BRIEF DESCRIPTION OF THE DRAWINGS

FIG. 1 is an elevational view of an embodiment of the fastener of the invention prior to installation;

FIG. 2 is a plan view of the lower surface of the staple member of the embodiment of FIG. 1;

FIG. 3 is a horizontal section view taken along line 3—3 in FIG. 4 and showing pockets in the receiving member for receiving the prongs of the staple;

FIG. 4 is an elevational view showing the fastener of FIG. 1 when installed;

FIG. 5 is another embodiment of the fastener of the invention in which the prongs of the staple member extend through the receiving member;

FIG. 6 is a vertical section view of an embodiment of the fastener of the invention in which the receiving member forms the prongs of the staple member;

FIG. 7 is a vertical section view of still another embodiment of the fastener of the invention in which the staple extends through both an upper cross-member and a lower receiving member;

FIG. 8 is an elevational view of an embodiment of the invention in which tabs are formed at opposite sides of the fastener;

FIG. 9 is a side elevational view of the fastener of FIG. 8;

FIG. 10 is a plan view of the fastener of FIG. 8;

FIG. 11 is a fragmentary vertical section view of an embodiment of the fastener of the invention in which the staple prong penetrates an extension on the receiving member;

FIG. 12 is a fragmentary plan view of the receiving member of the fastener of FIG. 11 prior to installation;

FIG. 13 is a fragmentary vertical section view of the fastener of FIG. 11 showing the prong of the staple formed into the receiving member;

FIG. 14 is a fragmentary vertical section view of a further embodiment of the invention in which a prong of the staple extends through the length of the extension;

FIG. 15 is a fragmentary vertical section view of the fastener of the invention showing the prong of the staple member engaged with an extension of the receiving member;

FIG. 16 is a plan view of the backing member of an additional embodiment of the invention having a pair of extensions for receiving the prongs of the staple member;

FIG. 17 is an elevational view of an embodiment of the fastener of the invention shown in FIG. 16;

FIG. 18 is a fragmentary perspective view of a strip of the staples of the invention; and FIG. 19 is a fragmentary perspective view of a strip of the receiving member of the invention.

DESCRIPTION OF THE PREFERRED EMBODIMENT

The staple-type fasteners of this invention generally comprise an upper or staple member and a lower receiving member. Referring to FIG. 1, the staple member 1 includes a cross-member 2 and a pair of prongs 3. The prongs 3 are parallel to and spaced apart from each other and are mounted substantially perpendicular to the cross-member 2. It is most usual, but not required that each of the prongs 3 be adjacent one end of the cross-member 2.

The prongs 3 may be manufactured from any relatively hard material, such as steel, brass, hard plastic or other hard metal. If the staple is to be used in a damp or otherwise corrosive environment, then it is preferable that the prongs be made from a material which will not rust or otherwise degrade in the particular environment. The material must not be brittle, but must be pliable enough to allow the prongs to be bent over during use (FIG. 4).

The cross sectional shape of the prongs is not critical. Any of the traditional staple shapes will suffice, such as circular, oval and rectangular. When referring to the width of the prongs, it is understood that as used herein the width refers to the cross sectional distance in a direction perpendicular to the plane in which the two prongs lie. Thus, when referring to a prong of circular cross section, the width is understood to mean the diameter.

Each prong 3 preferably has a point 10 at its exposed end. The point facilitates the penetration of the prong through the sheet material and reduces the damage done thereby. The type of point on the prong is not critical although it is preferable that the shape of the point not cause the prong to twist or bend when passing through the sheet material or when becoming embedded in the receiving member, (FIGS. 1 and 2).

The cross-member 2 may also be made of any convenient material such as metal or plastic. It is not necessary that the cross-member be made of material which is particularly hard as the cross-member does not penetrate through the sheet material. However, the material should be sufficiently strong so that the prongs 3 are retained within the cross-member 2.

The cross-member 2 may be in any convenient cross-sectional shape. However, it is preferable that it be on a rectangular cross section with the larger dimension of the rectangle being parallel to the plane of the sheet material. This cross sectional shape and orientation provides the maximum holding power of the staple member while utilizing the least quantity of material, (FIG. 2).

The prongs 3 are fixedly attached to the cross-member 2. The method of attachment is not critical as long as the prongs cannot become free of the cross-member during use or removal. Depending on the materials used, it may be possible to form the cross-member and prongs as a single integral unit. This can be conveniently done when the staple member is to be made of a plastic material, such as polypropylene or polyvinyl chloride.

The prongs may also be formed separately from the cross-member and then attached thereto. For example, the prongs may be made from steel and the cross-member from a thermoplastic material. The prongs are then embedded into the cross-member prior to the complete hardening of the plastic material.

In a preferred embodiment, the prongs are made from a single piece of a metallic material and generally in the form of a traditional metal staple. The metallic cross piece is then embedded into a cross-member of a thermoplastic material.

The width of the cross-member in the first embodiment is substantially greater than the width of the prongs. The greater the width of the cross-member, the less tendency of the staple to tear through the sheet material being fastened. It is generally preferable that the width of the cross-member be at least three times that of the prongs.

In the embodiment where the cross-member is of equal width to the prongs, it is most convenient to utilize a traditional staple formed from a single length of wire or ribbon.

The above-described staple member may be used itself as a fastening device in a manner similar to that of a traditional staple. It is preferable, however, that the staple member described above be used in conjunction with a receiving member 11 (FIGS. 1, 3 and 4). As shown in FIGS. 1 and 3, the receiving member or plate is disposed adjacent the opposite surface of the sheet material as is the staple member. During use, as shown in FIG. 4, the prongs of the staple member pass through the sheet material 4, through at least a portion of the receiving member 11, and the points 10 of the prongs become embedded in the material of the receiving member 11.

In the embodiment illustrated in FIG. 1, the receiving member is constructed from at least two distinct layers; an upper layer 6 which is generally made from a relatively soft material and a lower layer 5 which is generally made from a harder material.

The total thickness of the receiving member must be sufficiently great to allow the prong to become completely embedded therein. Generally, the upper layer 6 will comprise the majority of the thickness of the receiving member.

As shown in FIG. 2, during use, the prongs 3 of the staple member are driven through the sheet material 4 and into the soft upper layer 6. This layer should be made of a material into which the prongs will penetrate easily, such as a soft plastic.

The prongs 3 penetrate through the soft upper layer 6 until they contact the harder lower layer 5. This layer should be made of a harder material which the prong cannot penetrate easily, such as a plastic harder than the plastic of the prong, or a thin metal sheet. The prongs upon coming into contact with the lower layer 5 are deflected upward into the upper layer 6, wherein they become embedded.

In order to facilitate the proper bending of the prongs, it is preferable to provide small depressions or pockets 7 (FIGS. 1 and 3) into which the prongs are directed. The curvature of the pockets 7 then direct the prongs into the correct conformation. As the staple member is urged downward, the pointed end 10 of the prong contacts the pocket 7. As this initial contact is not perpendicular to the surface of the lower layer 5, there is less chance of the prong penetrating into or through the lower layer 5.

The pockets 7 are positioned in the receiving member to direct the prongs into the desired position. Generally they will be colinear and extend along the lengthwise axis of the receiving member. The pockets are generally shaped similarly as the pockets in the bottom anvil of an ordinary stapling machine. The pockets 7 can be registered under the prongs of the staple member to direct both prongs inwardly, as shown in FIG. 1, or both outwardly (not shown). It is preferable to direct one prong in an upward fashion and the other in an outward direction whenever it is important to have the fastener be very easily removable. In such an event, the size of the receiving member must be sufficiently large to wholly enclose the bent prongs, (FIG. 6).

The receiving member 11, is generally of substantially the same length as the cross-member of the staple member. However, when utilizing a receiving member in which at least one prong is bent in an outward direction, it may be necessary to have the receiving member somewhat longer than the cross-member. The width of the receiving member is not critical, but is preferably of at least as wide as the cross-member, so the resistance to a tear through material is not reduced.

In the embodiment shown in FIG. 5, the receiving member 12 is a single layer 9. This generally corresponds in material and thickness to the upper layer 6 of FIGS. 1 and 4. When using the fastener of this embodiment, the prongs are directed upward in a manner similar to that of a conventional staple. The stapling machine is provided with a lower anvil which is provided with pockets which direct the prongs in the desired direction.

The prongs are bent by the anvil of the stapler in a slightly upward direction so that the points 10 of the prongs become embedded in the member 9.

Either of the embodiments 11, 12 of the receiving member may optionally be fitted with a tab to facilitate the removal of the receiving member. The tab 8 may be formed integrally with the receiving member. When it is desired to remove the fastener, the tab 8 is grasped with the fingers and the receiving member is drawn apart from the attached sheets. As the receiving member is pulled away from the prongs, the prongs will at least be partially straightened. The staple member can then be withdrawn through the holes in the sheet material which were formed by the prongs. In this manner, the sheet material is not ripped or damaged when removing the fastener.

It may also be desirable to provide a tab 13 (FIG. 5) on the staple member. In this case, the user may grasp both tabs and separate the fastened materials.

Either of the tabs 8, 13 may be slightly bent away (shown for tab 13) from the surface of the sheet material to facilitate the grasping of them by the user.

As shown in FIG. 6 receiving member 14 comprises upper layer 14a of relatively soft material similar to upper layer 6 of receiving member 11 and lower layer 14b which is made from a harder material. Thus, lower layer 14b can be a comparatively hard resin material or metal. Tab 15 can be provided for receiving member 14 to assist in removal of the receiving member. Staple member 16 can include cross-member 16a in which is disposed staple 16b having end portions 16c.

In use, receiving member 14 is placed adjacent to one side of sheet material 4 which is to be secured by the fastener of the invention. Staple member 16 is positioned adjacent the opposite side of the sheet material in alignment with the receiving member. Upon applying force directing the staple member toward the receiving member, the end portions 16c penetrate the sheet material and upper layer 14a of the receiving member. Thereafter the end portions 16c abut lower layer 16b and, due to its hardness, the end portions are bent and caused to advance laterally through the softer material of the upper layer 14a. With this construction, the hardness of the material of the lower layer enables the end portions of staple 16b to be formed without the need of pockets 7 as in receiving member 11.

In place of staple member 1 or 16, a traditional wire staple can be used with receiving members 11, 12 or 14. Thus, the fastener of the invention can be used without the provision of a cross-member such as cross-member 2 of 16a.

The length of the prongs of the upper staple member 1, 11, or 16 or of a wire staple if used without a cross-member is selected to determine the extent to which the prongs are formed when applying the fastener of the invention. In the case of a construction similar to that of FIG. 5, prongs 3 may be selected to have a short straight length which prevents them from extending through receiving member 12 and being bent toward the receiving member. In the case of the short length prong construction, the ends of the straight prongs are engaged by friction alone in the receiving member after installation.

In the embodiment of FIG. 7, staple 17 extends through upper member 18 and lower member 19. Tabs 18a and 19a can be provided to assist in disassembly of the fastener.

As shown in FIGS. 8, 9 and 10, staple member 20 comprises oblong body portion 20a extending in alignment with staple 21. Tabs 20b extend laterally from the body portion and assist in the removal of the staple member.

In the embodiment shown in FIGS. 1, 5, 6 and 7, the staple member or the body member can each be provided with a plurality of tabs either in alignment with the direction of the prongs or at right angles to the direction of the prongs as shown in FIGS. 8-10.

As shown in FIGS. 11 and 12, receiving member 22 is provided with extensions 22a which are adapted to be engaged by the prongs 23a of staple member 23. In applying staple 23 to sheet material 24, extensions 22a are initially deflected to a position extending adjacent to the surface of receiving member 22 opposite the sheet material. Thereafter the prongs 23a of the staple are forced through the sheet material, the receiving member 22, and the extension 22a. With this construction the receiving member can be formed from relatively thin material since the extensions, when deflected adjacent to the receiving member, provide an additional thickness of material which is engaged by prongs 23a of the staple. As shown in FIG. 13, prongs 23a can be formed to the extent that they penetrate the extensions.

In the embodiment of FIG. 14 prongs 23a are formed into the interior of the length of extension 22a in order to enclose the prongs after the stapling operation has been completed.

In the embodiment of FIG. 15 extensions 22a are maintained in the plane of receiving member 22 during installation of staple 23. With this construction prongs 23a are deflected outwardly toward the extensions and into engagement therewith.

As shown in FIGS. 16 and 17 receiving member 24 is provided with a pair of extensions 24a each attached at end portion 24b to the receiving member. Prior to the installation of staple 25 through sheet material 26, the extensions are positioned adjacent to the surface of receiving member 24 opposite the sheet material 26. Upon forcing prongs 25a of the staple into position, the prongs extend through the sheet material, penetrate the receiving member 24 and the extensions 25a. The prongs are then formed into engagement with the extensions.

In any of the constructions of FIGS. 11-17 staples 23 and 24 can be replaced with the staple member of the invention such as shown in FIGS. 1, 6 and 7.

As shown in FIGS. 18 and 19 the staples and receiving members of the invention can be provided in strip form. In FIG. 18 strip 27 includes a plurality of staple members 1 in which the cross-members 2 are connected to one another. In FIG. 19 a plurality of receiving members 11 are attached to one another. Strip 27 can be provided with indentations or perforations 29 extending between adjacent cross-members for facilitating severance of cross-members when they are applied. Similarly, strip 28 of receiving members 19 can be provided with indentations extending between adjacent receiving members.

A traditional machine for applying wire staples can be employed to apply the staples of the invention when provided in a strip form. If the strip form includes extensions for each cross-member, suitable clearance would be provided in the stapling machine for the extensions projecting out from the strip. The traditional stapling machine can also be conveniently modified to support the receiving members in strip form.

What is claimed is:

1. In a two element fastener for sheet materials of the type that includes a staple having a cross-member and a pair of parallel, bendable prongs spaced apart at a predetermined distance and fixedly attached to and extending perpendicularly from the cross-member and a receiving member for the free ends of the prongs, the improvement wherein the receiving member comprises: an oblong thin member of predetermined thickness having oppositely disposed substantially flat continuous sides extending parallel to one another and spaced apart by the predetermined thickness, the length of the member being greater than the distance of the spacing of the prongs by an amount equal to a fraction of the spacing of the prongs, the member being formed of material soft enough to be punctured completely through the thickness thereof by the staple without bending the prongs, the side of the member opposite the staple being adapted to receive the free ends of the prongs after the bending of the prongs, the member being strong enough to permit disassembly of the receiving member from the staple subsequent to bending over the prongs after penetration through the receiving member by manually exerting a separating force between the cross-member of the staple and the receiving member sufficient to at least partially straighten and withdraw the prongs from the receiving member without tearing the material thereof.

2. The fastener of claim 1 wherein the receiving member comprises a tab extending from an edge of the receiving member to facilitate grasping said member for manually disassembling the fastener.

3. The fastener of claim 2 wherein the staple further comprises a tab extending from the cross-member in substantial registry with the tab on the receiving member to further facilitate manual disassembly of the fastener.

4. The fastener of claim 2 wherein the tab on the receiving member is located beyond one end of a line segment extending along the surface of the layer of soft material, the ends of the line segment being spaced apart by a distance substantially corresponding to the spacing of the staple prongs.

5. The fastener of claim 4 wherein the staple further comprises a tab extending from the cross-member in substantial registry with the tab on the receiving member to further facilitate manual disassembly of the fastener.

6. In a two element fastener for sheet materials of the type that includes a staple having an elongated cross-member and a pair of parallel bendable prongs spaced apart from one another at a predetermined interval along the length of the cross-member and fixedly attached to and extending perpendicularly from the cross-member and a receiving member for the free ends of the prongs, the improvement wherein the receiving member comprises:

an elongated thin plate having end portions located at the extremities of the length thereof and oppositely disposed face portions, each of the end portions of the plate being disposed beyond and yet substantially adjacent the different ends of a line extending along the length of the plate and having its ends spaced apart at a distance substantially corresponding to the predetermined interval between the parallel prongs, the plate being formed of material being sufficiently soft to enable the face of the plate directed toward the prongs to be penetrated before bending the prongs to engage the prongs to the plate, the material of the plate being strong enough to permit disassembly of the receiving member from the prongs by manually exerting a separating force between the crossmember of the staple and the receiving member sufficient to withdraw and at least partially straighten the prongs from the receiving member without tearing the material thereof.

7. A two-element fastener in accordance with claim 6 in which the elongated cross-member has a width substantially greater than the thickness of the staple.

8. A two-element fastener in accordance with claim 6 in which the receiving member has a width substantially greater than the thickness of the staple.

9. A two-element fastener in accordance with claim 6 and further comprising a tab extending from an edge of the receiving member to facilitate grasping the receiving member for manually disassembling the fastener.

10. A two-element fastener in accordance with claim 9 wherein the tab comprises one of the end portions of said elongated thin plate.

11. A two-element fastener in accordance with claim 10 wherein the staple further comprises a tab extending from the cross-member in substantial registry with the tab on the receiving member to further facilitate manual disassembly of the fastener.

12. A two-element fastener for sheet materials according to claim 6, wherein the receiving member comprises:

an anvil portion integral with the surface of the thin plate opposite the face thereof for deflecting the ends of the prongs back into the thin plate after penetration therethrough under the further influence of the fastening forces.

13. The fastener of claim 12 wherein the anvil portion of the receiving member comprises a pair of curved pockets, corresponding edges of which are spaced apart by a distance approximately equal to the spacing of the prongs, for contacting the ends of the prongs at an oblique angle to facilitate bending the prongs when the staple is urged into the receiving member by the fastening forces.

14. The fastener of claim 12 wherein the anvil portion of the receiving member comprises a layer of material which cannot be penetrated by the prongs, bonded to said surface of the material of the thin plate which can be penetrated by the prongs.

15. The fastener of claim 12 wherein the cross-member has a substantially greater width than the width of the prongs.

16. The fastener of claim 15 in which the width of the cross-member is at least three times the width of the prongs.

17. The fastener of claim 12 in which the prongs are attached adjacent to the ends of the cross-member.

18. The fastener of claim 12 and further comprising a tab affixed to one end of the staple cross-member to facilitate disassembly of the fastener.

19. The fastener of claim 12 and further comprising a tab affixed to one end of the receiving member to facilitate disassembly of the fastener.

20. A two-element fastener according to claim 6, wherein the cross-member comprises:

an elongated body portion extending between the prongs and a flat tab portion extending laterally from both sides of the body portion and forming one surface of the cross-member to facilitate manual grasping for disassembly of the fastener.

21. The fastener of claim 20 wherein the flat tab portion comprises a flat circular disk.

22. A two-element fastener according to claim 6, wherein the receiving member comprises:

a pair of tabs integrally attached to one adjacent to either end of the thin plate and extending toward the opposite end of the thin plate parallel to one surface thereof, the material of the receiving member being soft enough for penetration through the thin plate and one tab by each prong before deflection of said prong to overlie the tab, the tabs being manually bendable to a position approximately perpendicular to the one surface of the body portion for substantially straightening the bent-over prongs and facilitating disassembly of the fastener.

23. The fastener of claim 22 wherein the tabs are colinear.

24. The fastener of claim 22 wherein the tabs are parallel and offset laterally from each other.

25. A two-element fastener according to claim 6, wherein the receiving member comprises:

a pair of tabs integrally attached one to each end of the thin plate and extending outwardly therefrom colinear with said one dimension, the material of the thin plate and tabs being soft enough to permit penetration of the staple prongs completely therethrough before deflection outwardly into underlying engagement with the tabs, and the tabs being manually bendable to a position perpendicular to the thin plate for substantially straightening the bent-over prongs and for facilitating disassembly of the fastener.

26. A two-element fastener according to claim 6, wherein the receiving member comprises:

a pair of tabs integrally attached one adjacent to either end of the thin plate at locations spaced by a distance equal to the spacing of the staple prongs, each tab extending toward the opposite end of the thin plate parallel to one surface thereof, the material of the receiving member being soft enough for penetration through the thin plate and into the corresponding tab by each prong before deflection of said prong to follow the direction of the tab so as to remain embedded therein, the tabs being manually bendable to a position approximately perpendicular to the one surface of the body portion for subsequently straightening the bent-over prongs and facilitating disassembly of the fastener.

* * * * *